(12) United States Patent
Liu et al.

(10) Patent No.: US 10,992,952 B2
(45) Date of Patent: Apr. 27, 2021

(54) INTERACTION OF ASYMMETRIC WEIGHTED MERGES AND OTHER CODING TOOLS

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/987,787

(22) Filed: Aug. 7, 2020

(65) Prior Publication Data
US 2020/0366928 A1 Nov. 19, 2020

Related U.S. Application Data

(63) Continuation of application No. PCT/IB2019/054603, filed on Jun. 4, 2019.

(30) Foreign Application Priority Data
Jun. 5, 2018 (WO) ................ PCT/CN2018/089919

(51) Int. Cl.
*H04N 19/52* (2014.01)
*H04N 19/126* (2014.01)
*H04N 19/176* (2014.01)

(52) U.S. Cl.
CPC ........... *H04N 19/52* (2014.11); *H04N 19/126* (2014.11); *H04N 19/176* (2014.11)

(58) Field of Classification Search
None
See application file for complete search history.

(56) References Cited

U.S. PATENT DOCUMENTS
2019/0200040 A1* 6/2019 Lim .................... H04N 19/583

FOREIGN PATENT DOCUMENTS
WO 2017122997 A1 7/2017
WO 2018012886 A1 1/2018

OTHER PUBLICATIONS

Chen et al., "Decoder-Side Motion Vector Refinement Based on Bilateral Template Matching" 4th Meeting: Chengdu, CN, 15-21 Oct. 2016. Joint Video Exploration Team (JVET) of ITU-T SG 16 WP 3 and ISO/IEC JTC 1/SC 29/WG 11, JVET-D0029 (Year: 2016).*

(Continued)

*Primary Examiner* — Stuart D Bennett
(74) *Attorney, Agent, or Firm* — Perkins Coie LLP

(57) ABSTRACT

Devices, systems and methods for asymmetric weighted bi-predictive merging in video coding are described. In a representative aspect, a method for decoding video data includes determining that a current video block of the video data is predicted from an asymmetric bi-predictive merge candidate, wherein different weights are used for a first reference block and a second reference block, and making, based on the determination, a determination between enabling and disabling a coding tool for the current video block. In a case that the current video block is predicted from an asymmetric bi-predictive merge candidate, the coding tool is not applied to the current video block.

20 Claims, 21 Drawing Sheets

(56) References Cited

OTHER PUBLICATIONS

Chen et al. "EE3: Generalized Bi-Prediction," 4, JVET Meeting; Oct. 15-21, 2016; Chengdu; The Joint Video Exploration Team of ISO/IEC JTC1/SC29/WG11 and ITU-T SG.16, Document No. JVET-D0102-v3, Oct. 15, 2016.

Chen et al. JVET-G1001 "Algorithm Description of Joint Video Exploration Test Model 7 (JEM7)," Joint Video Exploration Team (JVET) of ITU-T SG 16 WP 3 and ISO-IEC JTC 1/SC 29/WG 11, 7th Meeting, Jul. 13-21, 2017, Torino, Aug. 19, 2017, Retrieved from the Internet: URL:http://phenix.int-evry.fr/jvet/doc_end_user/documents/7_Torino/wg11/JVET-G0001-v1.zip.

Hsu et al. "Description of SDR Video Coding Technology Proposal by MediaTek," 10, JVET Meeting; Apr. 10-20, 2018, San Diego, The Joint Video Exploration Team of ISO/IEC JTC1/SC29/WG11 and ITU-T SG. 16, Document No. JVET-J0018, Apr. 3, 2018.

International Search Report and Written Opinion from PCT/IB2019/054569 dated Aug. 22, 2019 (16 pages).

International Search Report and Written Opinion from PCT/IB2019/054603 dated Oct. 16, 2019 (21 pages).

Chen et al. "Generalized Bi-Predition for Inter Coding," May 17, 2016, JVET-C0047.

Li, X, "Crosscheck of JVET- D0029 Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdue, CN, Oct. 15-21, 2016, Document JVET-D0154, 2016.

Sethuraman, Sriram, "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting: Marrakech, MA Jan. 9-18, 2019, Document JVET-M0147, 2019.

Chujoh et al. "Non-CE9: On Conditions for DMVR and BDOF," JVET-N0146, Mar. 26, 2019.

* cited by examiner

INTERACTION OF ASYMMETRIC WEIGHTED MERGES AND OTHER CODING TOOLS

CROSS-REFERENCE TO RELATED APPLICATIONS

This application is a continuation of International Patent Application No. PCT/IB2019/054603, filed on Jun. 4, 2019, which claims priority to International Patent Application No. PCT/CN2018/089919, filed on Jun. 5, 2018. All of the aforementioned patent applications are hereby incorporated by reference in their entireties.

TECHNICAL FIELD

This patent document is directed generally to video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to asymmetric weighted bi-predictive merging for motion compensation are described. More generally, the presently disclosed technology described provides enhancements to the merge mode for video coding.

In one representative aspect, the disclosed technology may be used to provide a method for video decoding using asymmetric weighted bi-predictive merging. This method includes determining that a current block of the video data is predicted from an asymmetric bi-predictive merge candidate wherein different weights are used for a first reference block and a second reference block, and based on the determination, making a determination between enabling and disabling a coding tool for the current video block. In a case that a video block is predicted from an asymmetric bi-predictive merge candidate, the coding tool is not applied to the current video block.

In another representative aspect, the disclosed technology may be used to provide a method for video encoding using asymmetric weighted bi-predictive merging. This method includes constructing a merge candidate based on an asymmetric weighting of a first reference merge candidate and a second reference merge candidate, wherein the asymmetric weighting comprises a first weight and a second weight that is different from the first weight, inserting, after the constructing, the merge candidate into a merge candidate list, deriving motion information from at least the merge candidate list, and encoding, based on the motion information, a current block of the video data that is inter coded.

In another representative aspect, the disclosed technology may be used to provide a method for decoding video data. The method includes receiving a current block of the video data that is inter coded, constructing a merge candidate based on an asymmetric weighting of a first reference merge candidate and a second reference merge candidate, where the asymmetric weighting includes a first weight and a second weight that is different from the first weight, and wherein the merge candidate comprises a motion vector and a corresponding reference picture, inserting, after the constructing, the merge candidate into a merge candidate list, deriving motion information from at least the merge candidate list, and decoding the current block based on the motion information, the motion vector and the corresponding reference picture.

In another representative aspect, the disclosed technology may be used to provide a method for video encoding using asymmetric weighted bi-predictive merging. This method includes constructing a merge candidate based on an asymmetric weighting of a first reference merge candidate and a second reference merge candidate, wherein the asymmetric weighting comprises a first weight and a second weight that is different from the first weight, inserting, after the constructing, the merge candidate into a merge candidate list, deriving motion information from at least the merge candidate list, and encoding, based on the motion information, a current video block of the video data that is inter coded. In a case that the current video block is predicted from an asymmetric bi-predictive merge candidate, a coding tool is not applied to the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
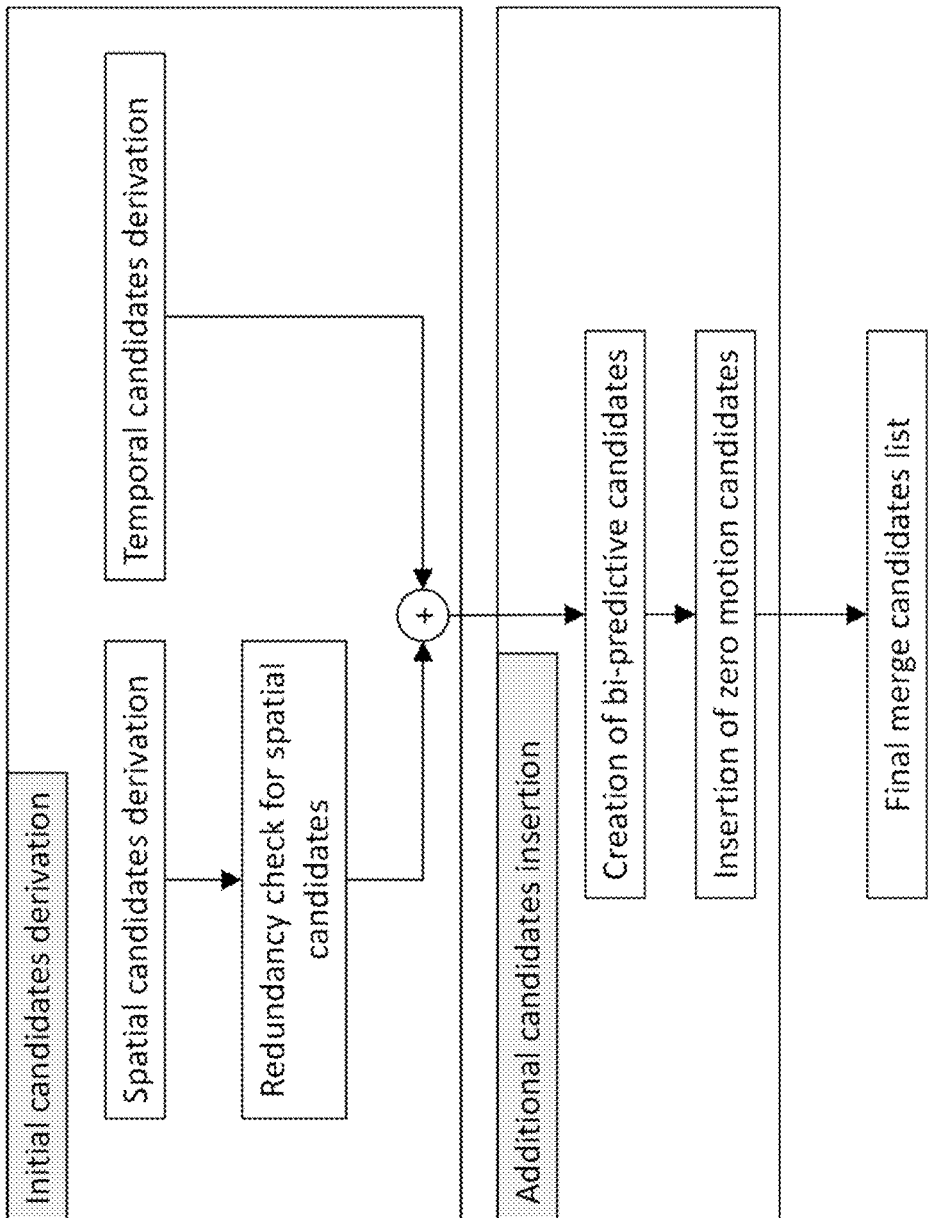
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve runtime performance. It is specifically related to merge modes in video coding. Section headings are used in the present document to improve readability of the description and do not in any way limit the discussion or the embodiments (and/or implementations) to the respective sections only. Sections are used in the present document for ease of understanding and do not limit scope of technologies and embodiments disclosed in each section to just that section.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
    Step 2: Additional candidates insertion
    Step 2.1: Creation of bi-predictive candidates
    Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
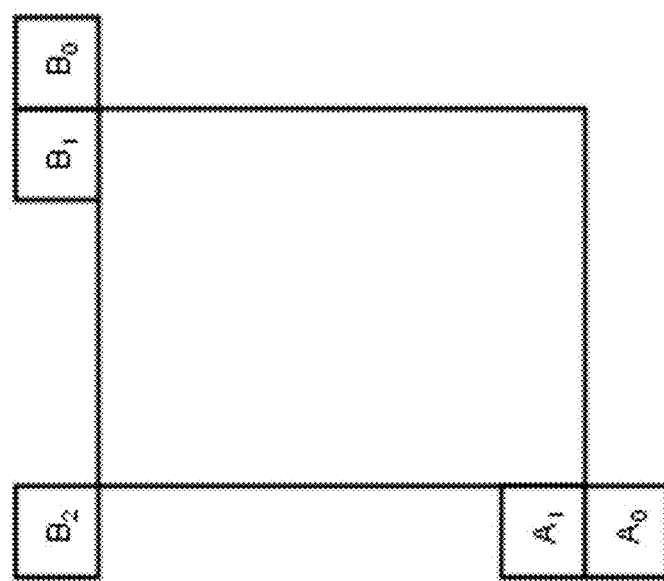
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
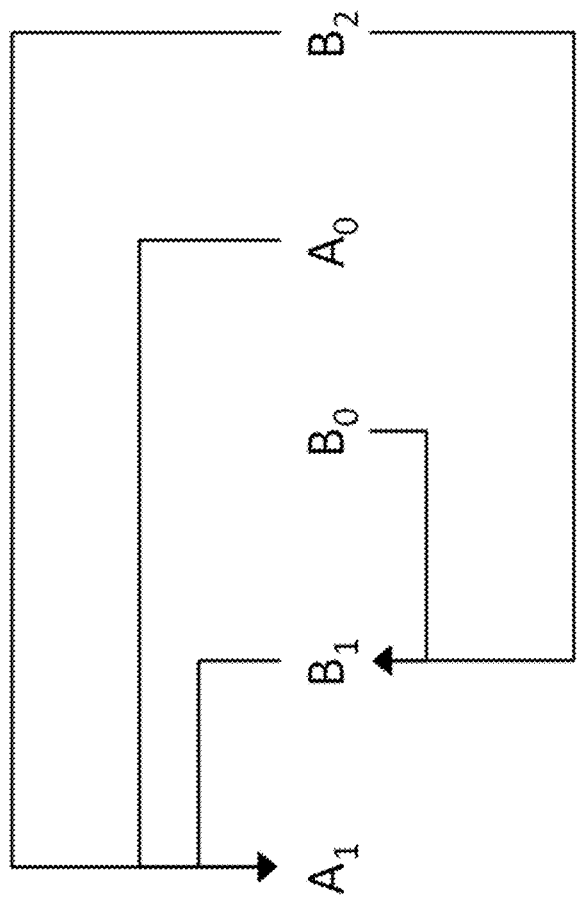
FIG. 3 shows an example of candidate pairs subject to a redundancy check of spatial merge candidates.
Figure 4B:
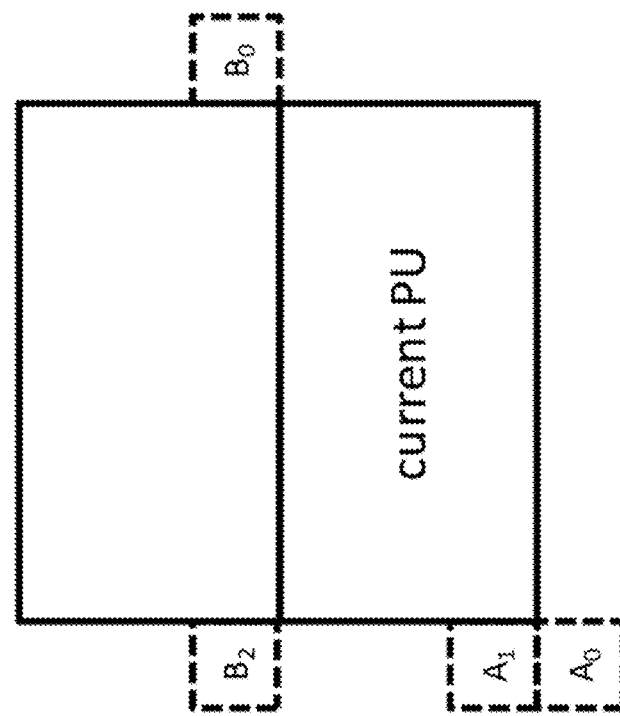
FIGS. 4A and 4B show examples of the position of a second prediction unit (PU) based on the size and shape of the current block.
Figure 4A:
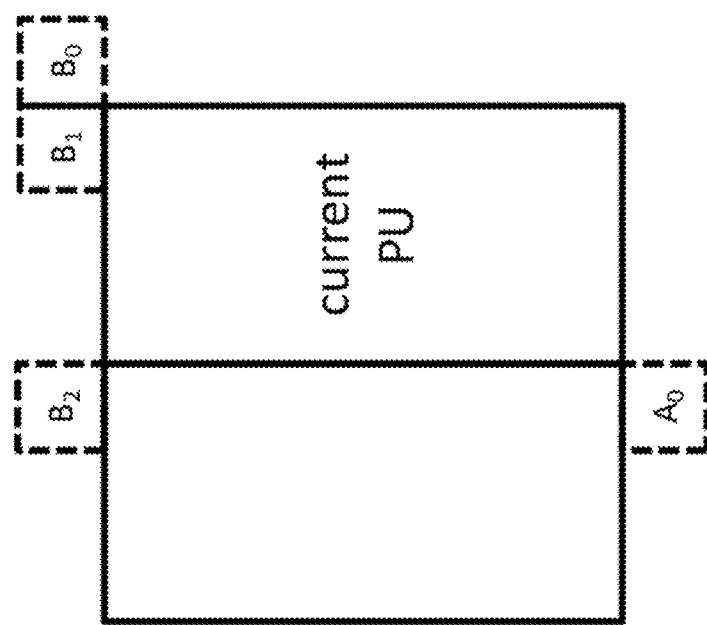

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B^1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
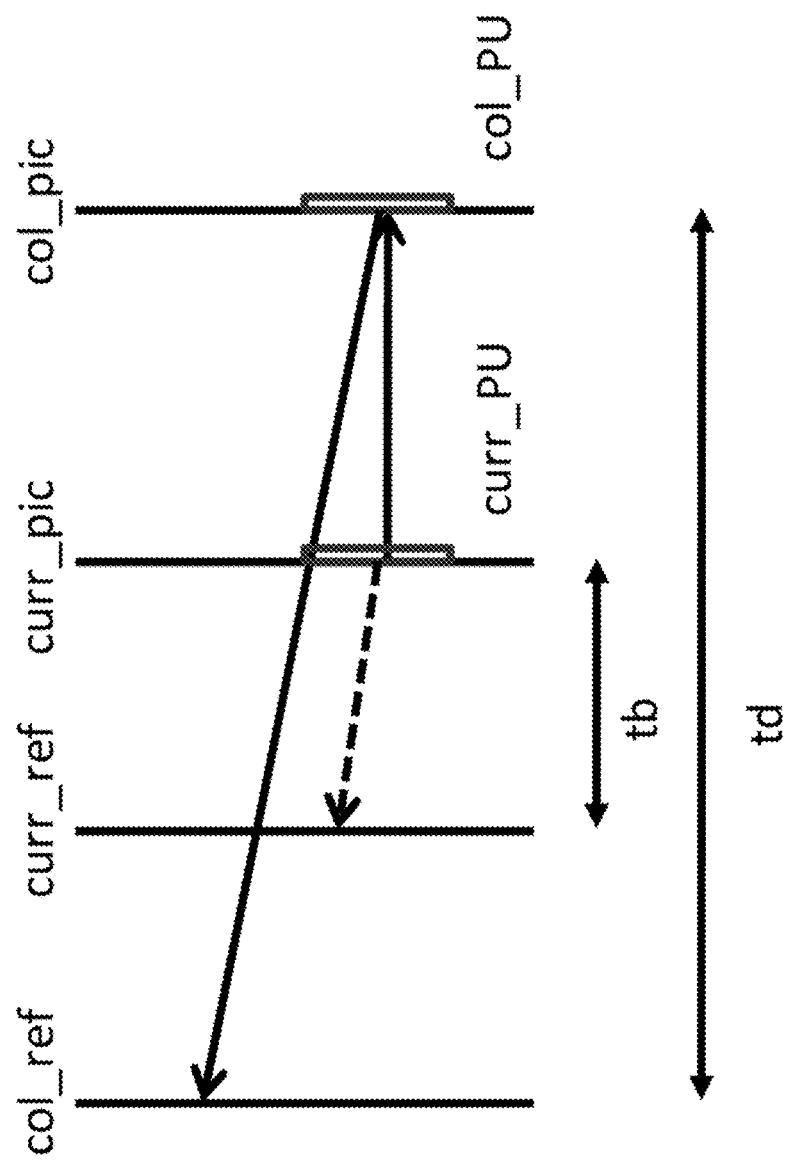
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
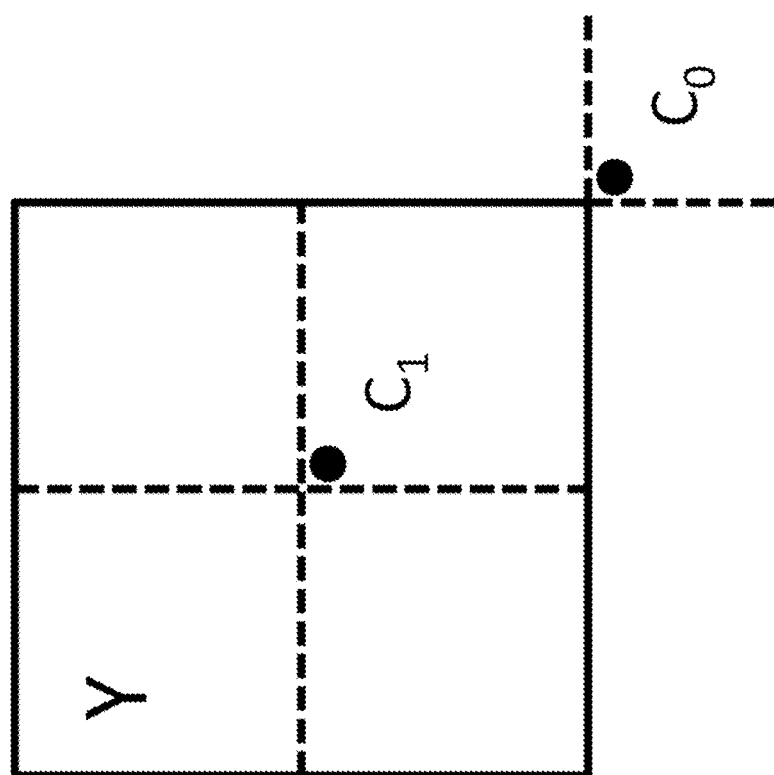
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C^0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
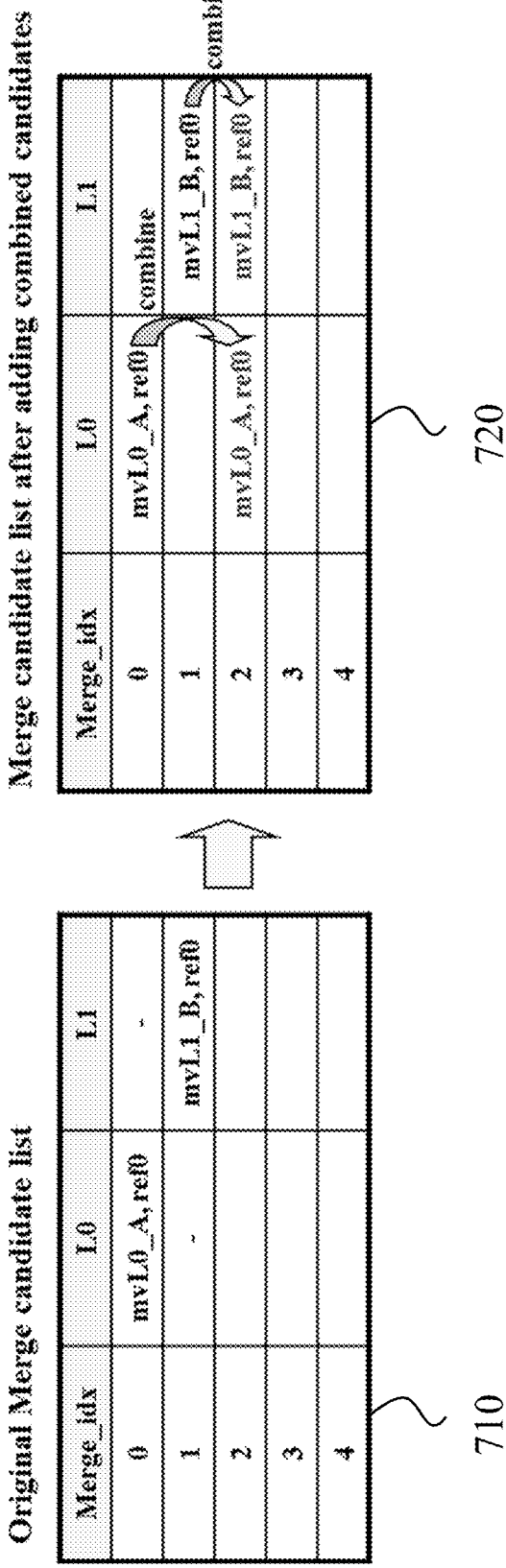
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS). When a MER is defined, merge candidates falling in the same region are marked as unavailable and therefore not considered in the list construction.

1.2 Embodiments of Motion Vector Prediction

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary.

1.2.1 Examples of Constructing Motion Vector Prediction Candidates

Figure 8:
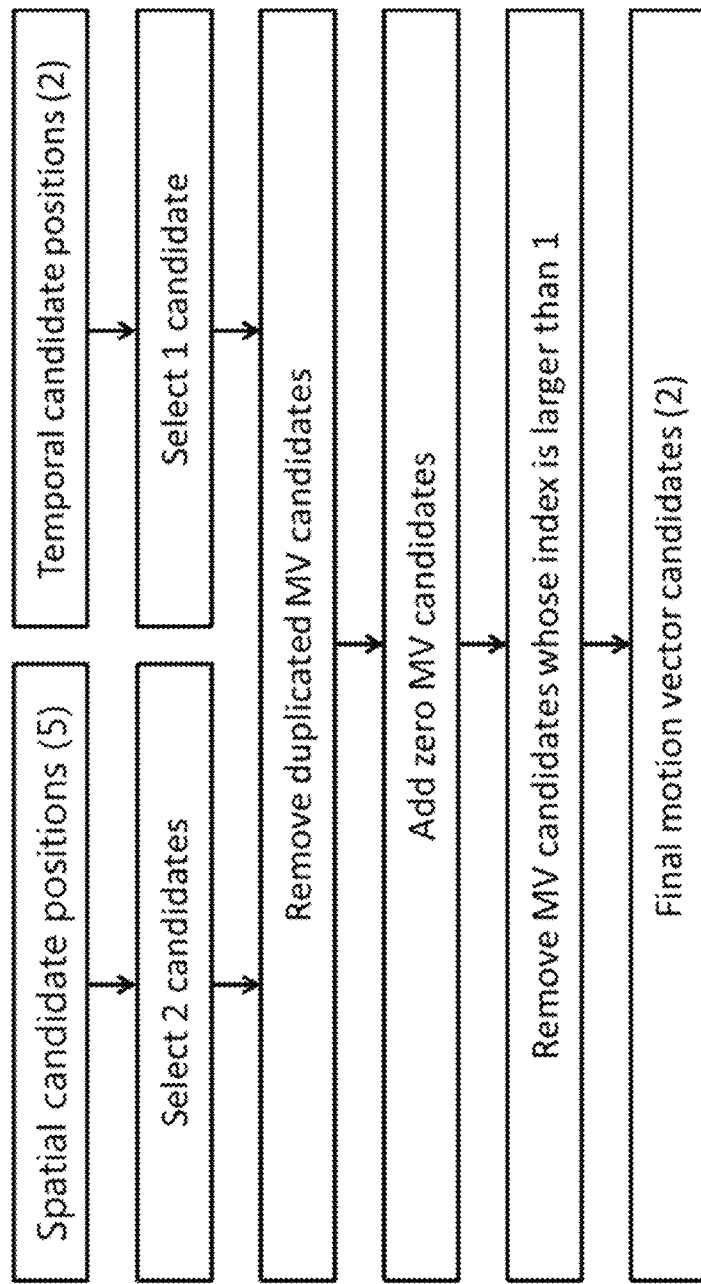
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
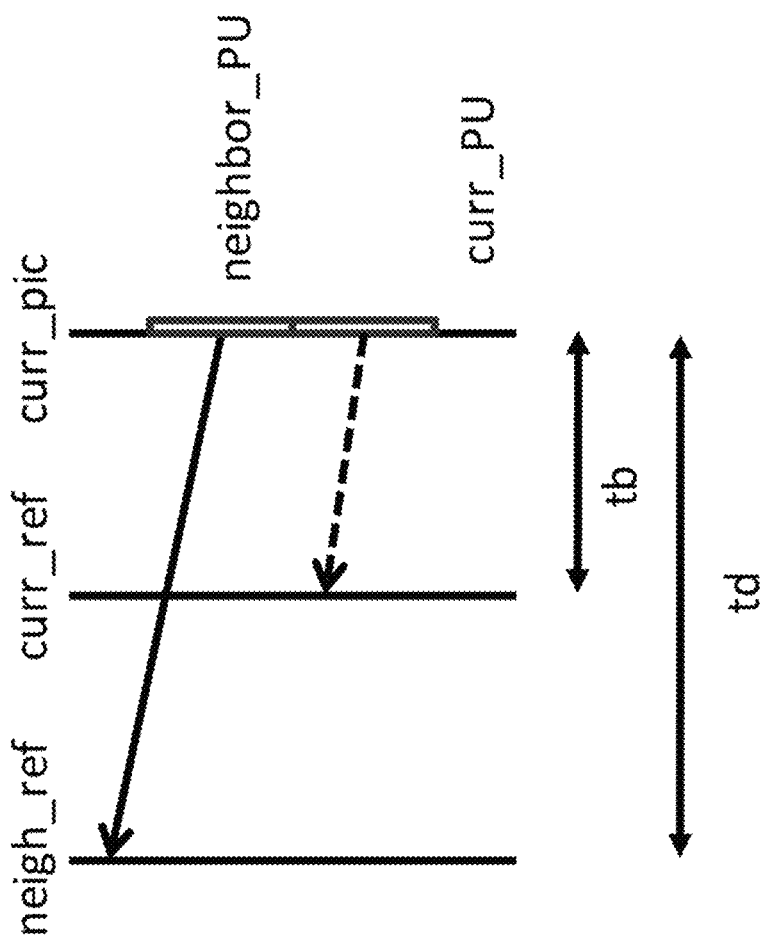
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2 Examples of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 10A and 10B.

Figure 10A:
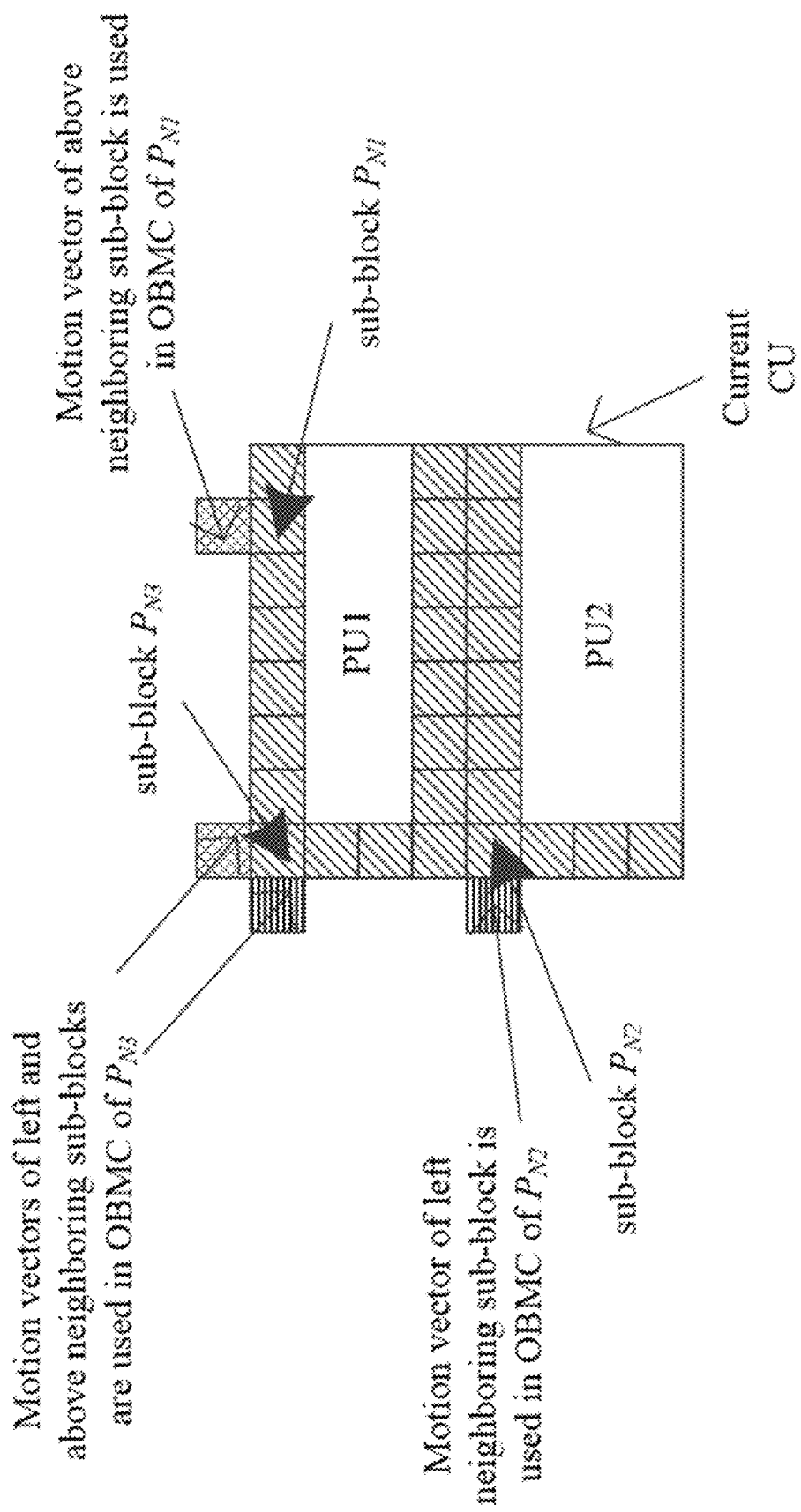
FIGS. 10A and 10B show example snapshots of sub-block when using the overlapped block motion compensation (OBMC) algorithm.
Figure 10B:
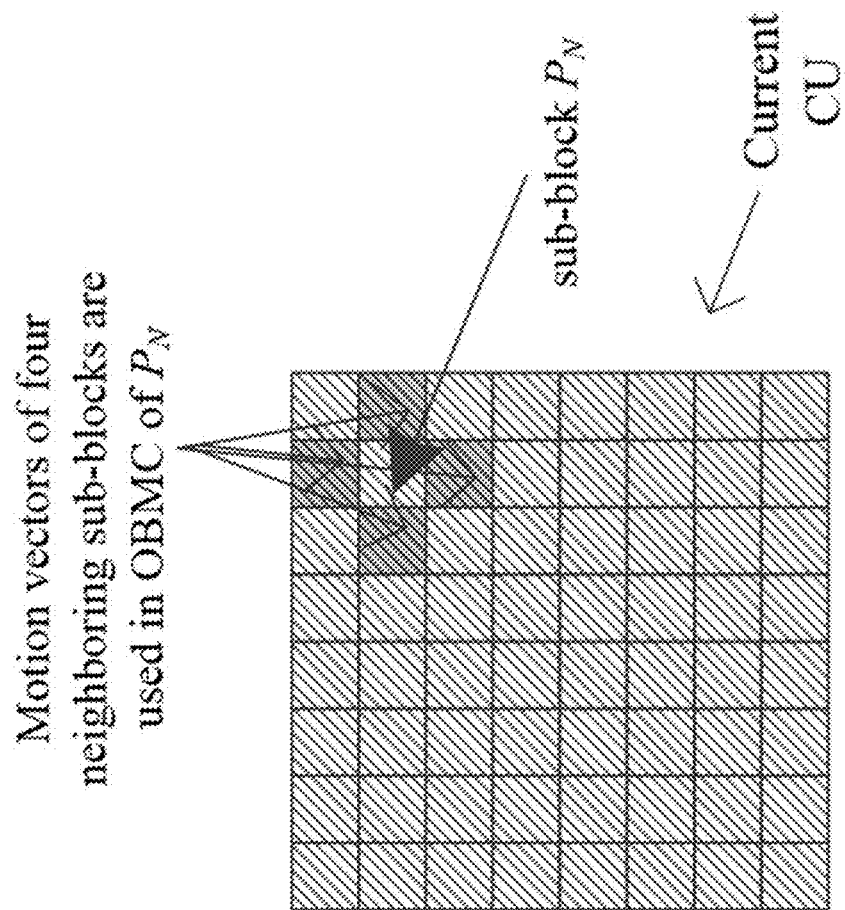

FIG. 10A shows sub-blocks at the CU/PU boundary, and the hatched sub-blocks are where OBMC applies. Similarly, FIG. 10B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors $\{1/4, 1/8, 1/16, 1/32\}$ are used for PN and the weighting factors $\{3/4, 7/8, 15/16, 31/32\}$ are used for PC. The exception are small MC blocks, (i.e., when height or width of the coding block is equal to 4 or a CU is coded with sub-CU mode), for which only two rows/columns of PN are added to PC. In this case weighting factors $\{1/4, 1/8\}$ are used for PN and weighting factors $\{3/4, 7/8\}$ are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.2 Examples of Local Illumination Compensation (LIC)

LIC is based on a linear model for illumination changes, using a scaling factor a and an offset b. And it is enabled or disabled adaptively for each inter-mode coded coding unit (CU).

Figure 11:
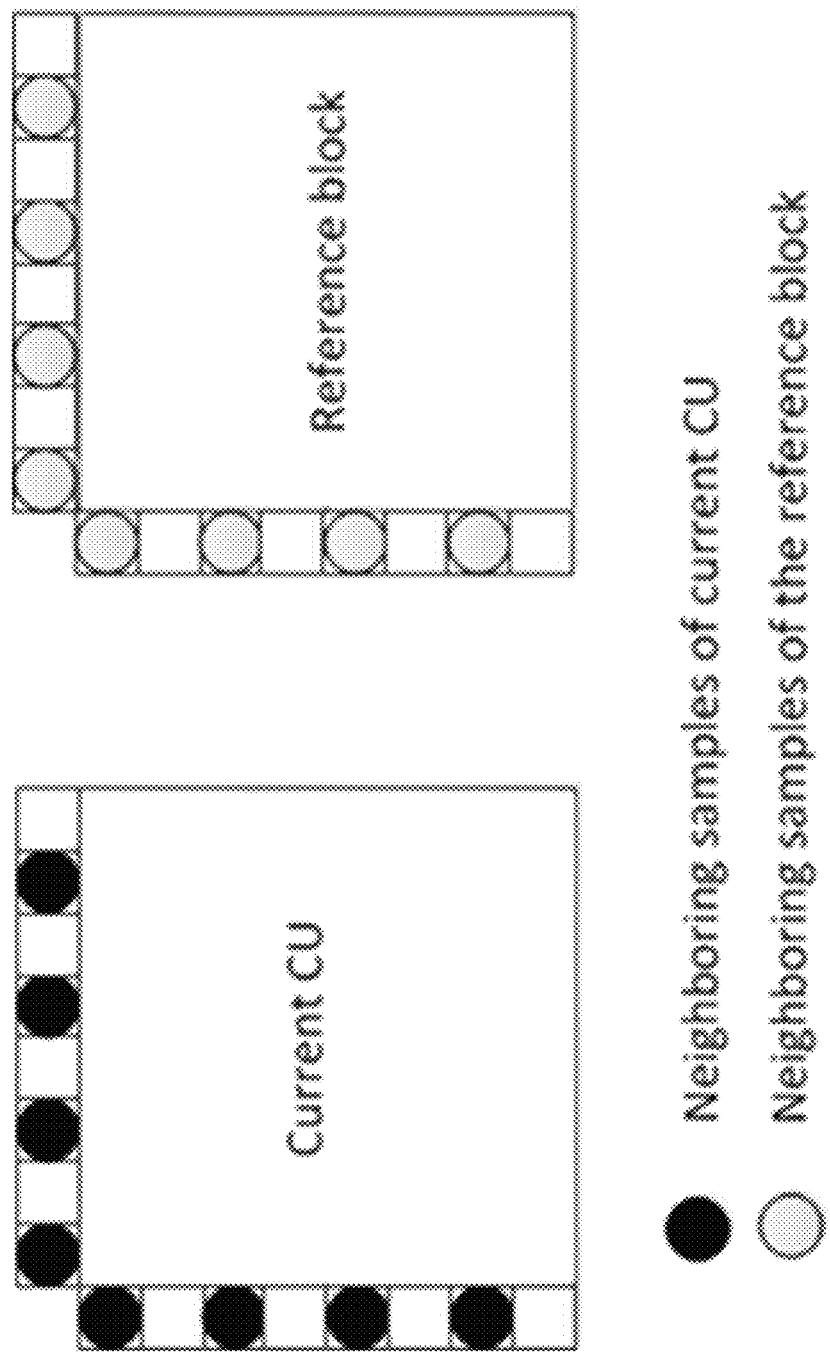
FIG. 11 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 11 shows an example of neighboring samples used to derive parameters of the IC algorithm. Specifically, and as shown in FIG. 11, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (1), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (1)}$$

Figure 12:
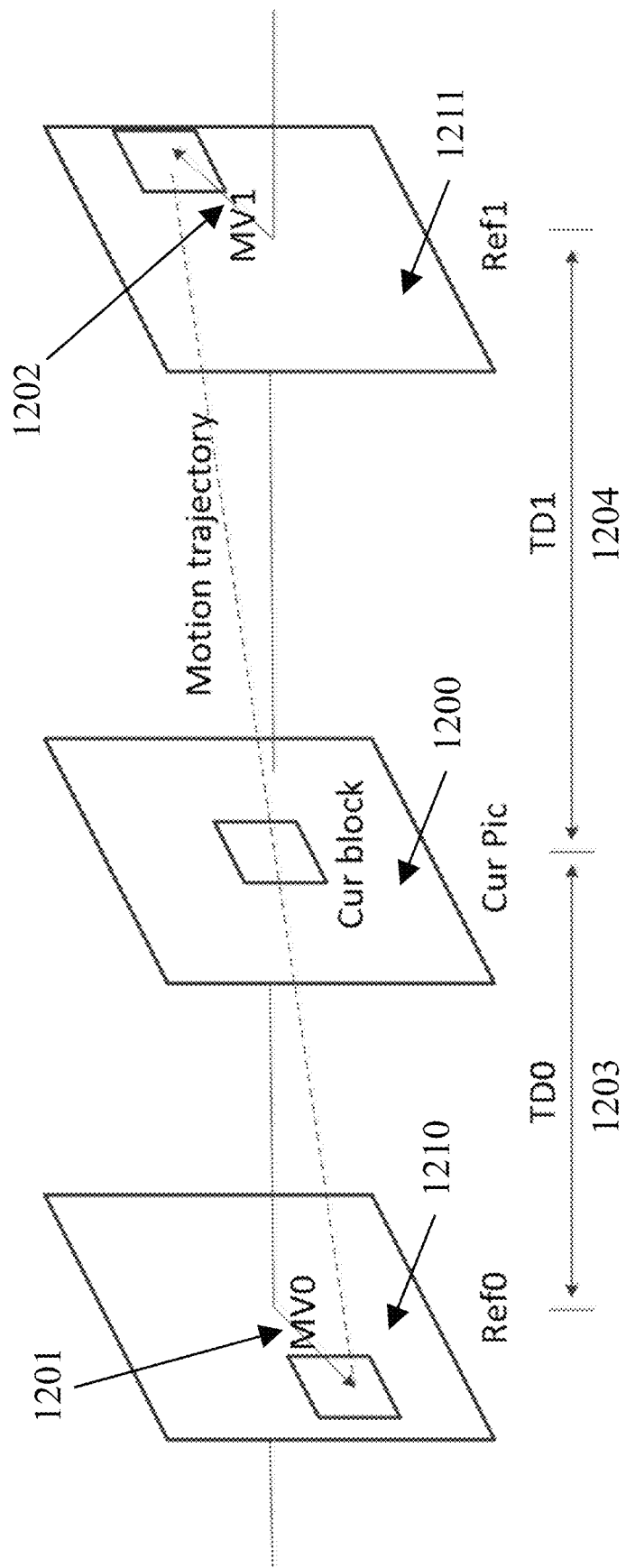
FIG. 12 shows an example of bilateral matching in pattern matched motion vector derivation (PMMVD) mode, which is a special merge mode based on the frame-rate up conversion (FRUC) algorithm.

FIG. 12 shows an example of bilateral matching used in the Frame-Rate Up Conversion (FRUC) method. The bilateral matching is used to derive motion information of the current CU by finding the closest match between two blocks along the motion trajectory of the current CU (1200) in two different reference pictures (1210, 1211). Under the assumption of continuous motion trajectory, the motion vectors MV0 (1201) and MV1 (1202) pointing to the two reference blocks are proportional to the temporal distances, e.g., TD0 (1203) and TD1 (1204), between the current picture and the two reference pictures. In some embodiments, when the current picture 1200 is temporally between the two reference pictures (1210, 1211) and the temporal distance from the current picture to the two reference pictures is the same, the bilateral matching becomes mirror based bi-directional MV.

Figure 13:
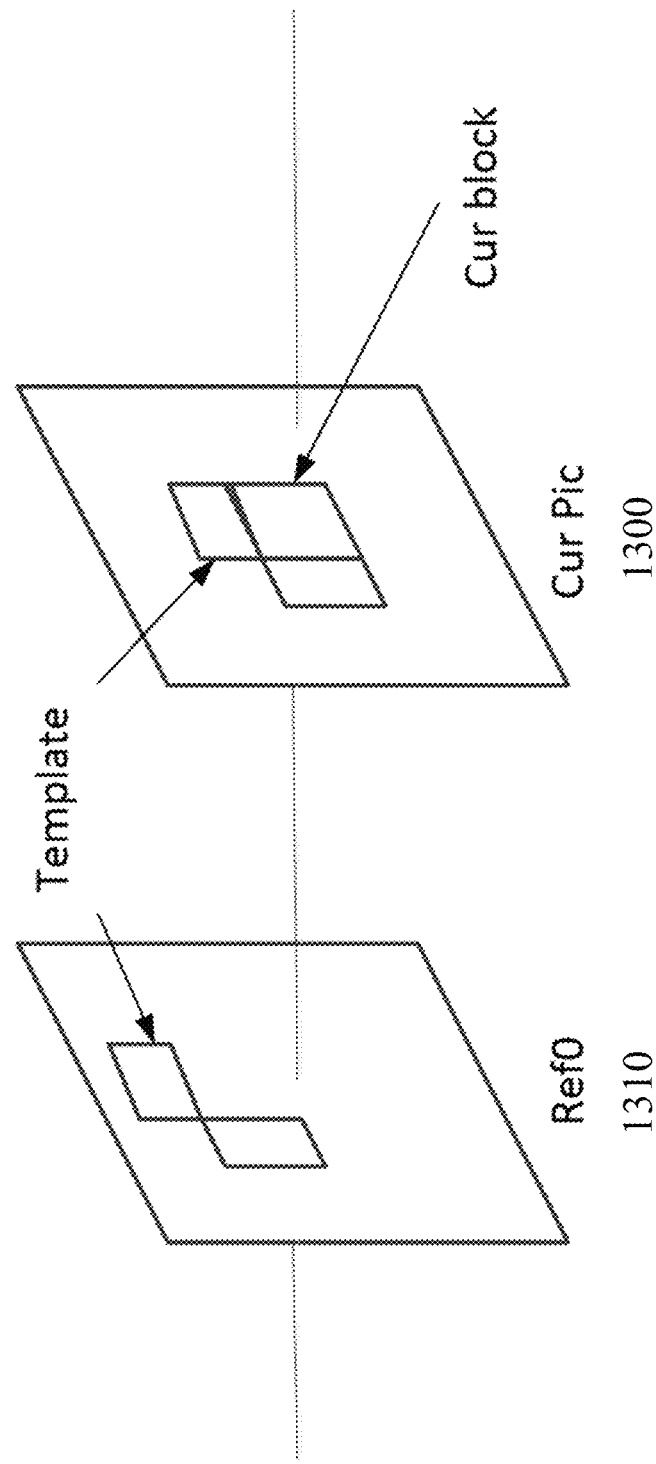
FIG. 13 shows an example of template matching in the FRUC algorithm.

FIG. 13 shows an example of template matching used in the Frame-Rate Up Conversion (FRUC) method. Template matching can be used to derive motion information of the current CU 1300 by finding the closest match between a template (e.g., top and/or left neighboring blocks of the current CU) in the current picture and a block (e.g., same size to the template) in a reference picture 1310. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $\text{ref}_a$) at reference list A. Then the reference picture $\text{ref}_b$ of its paired bilateral MV is found in the other reference list B so that $\text{ref}_a$ and $\text{ref}_b$ are temporally at different sides of the current picture. If such a $\text{ref}_b$ is not available in reference list B, $\text{ref}_b$ is determined as a reference which is different from $\text{ref}_a$ and its temporal distance to the current picture is the minimal one in list B. After $\text{ref}_b$ is determined, MVb is derived by scaling MVa based on the temporal distance between the current picture and $\text{ref}_a$, $\text{ref}_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 14:
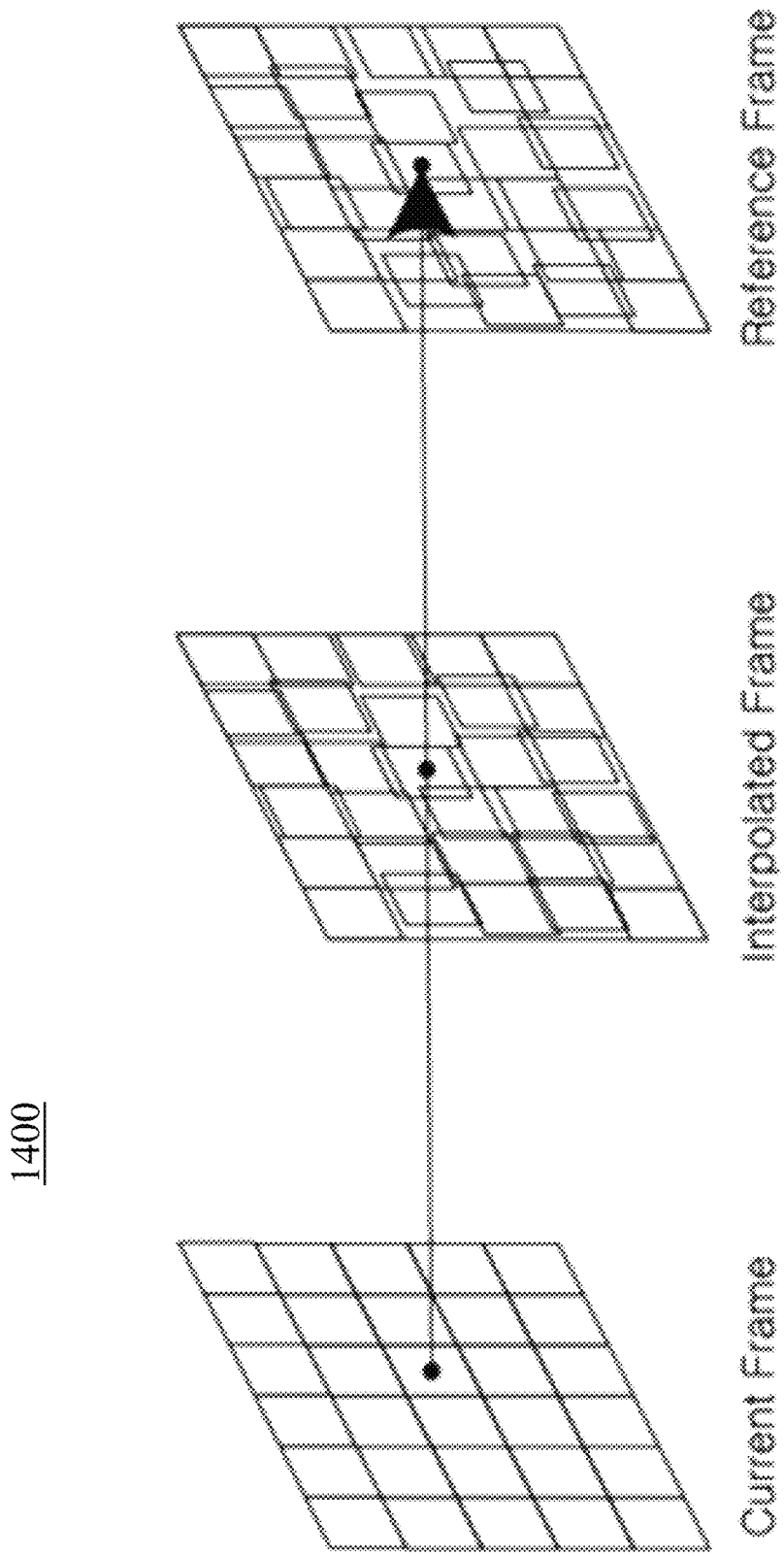
FIG. 14 shows an example of unilateral motion estimation in the FRUC algorithm.

In some embodiments, the motion field of each reference pictures in both reference lists is traversed at 4×4 block level. FIG. 14 shows an example of unilateral Motion Estimation (ME) 1400 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (2)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.4 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (3)}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (4)}$$

Figure 15:
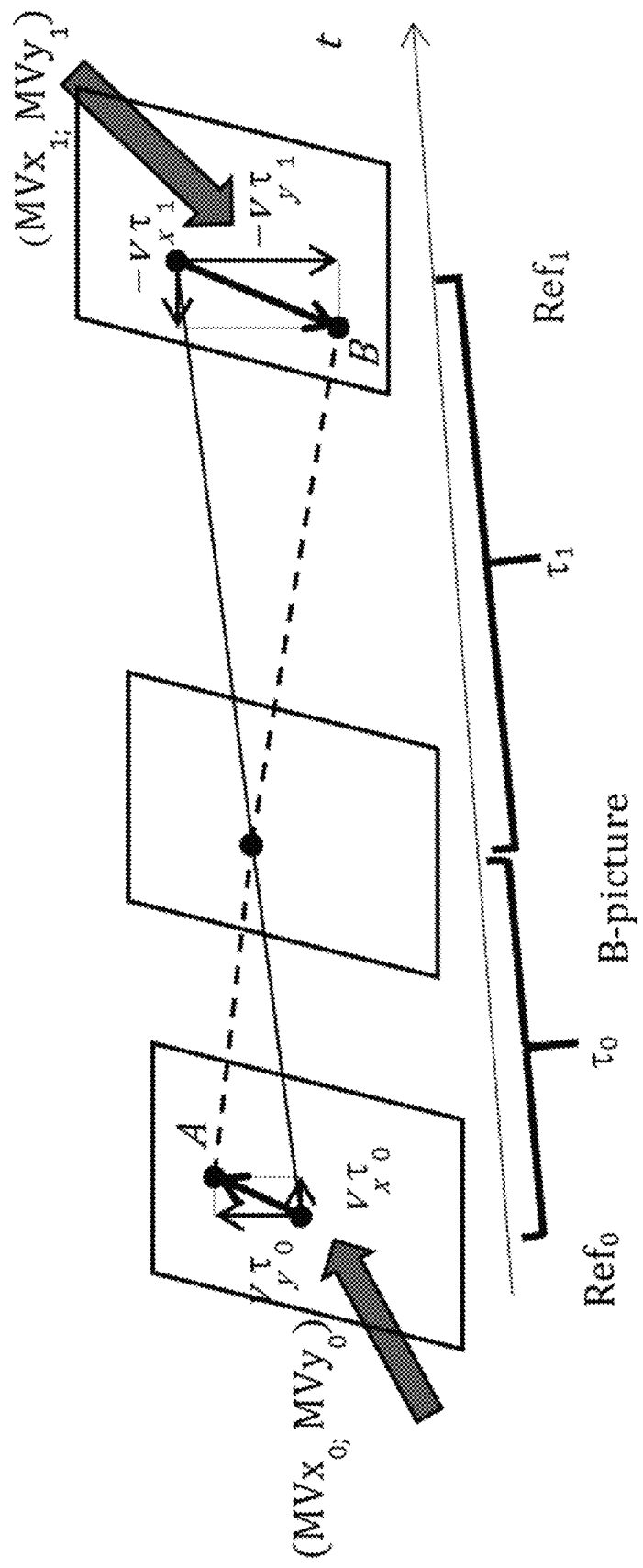
FIG. 15 shows an example of an optical flow trajectory used by the bi-directional optical flow (BIO) algorithm.

FIG. 15 shows an example optical flow trajectory in the Bi-directional Optical flow (BIO) method. Here, $\tau_0$ and $\tau_1$ denote the distances to the reference frames. Distances $\rho_0$ and $\tau_1$ are calculated based on POC for $Ref_0$ and $Ref_1$: $\tau_0$=POC(current)−POC($Ref_0$), $\tau_1$=POC($Ref_1$)−POC(current). If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g. $MVx_0$, $MVy_0$, $MVx_1$, $MVy_1 \neq 0$) and the block motion vectors are proportional to the time distance (e.g. $MVx_0/MVx_1 = MVy_0/MVy_1 = -\tau_0/\tau_1$).

Figure 16:
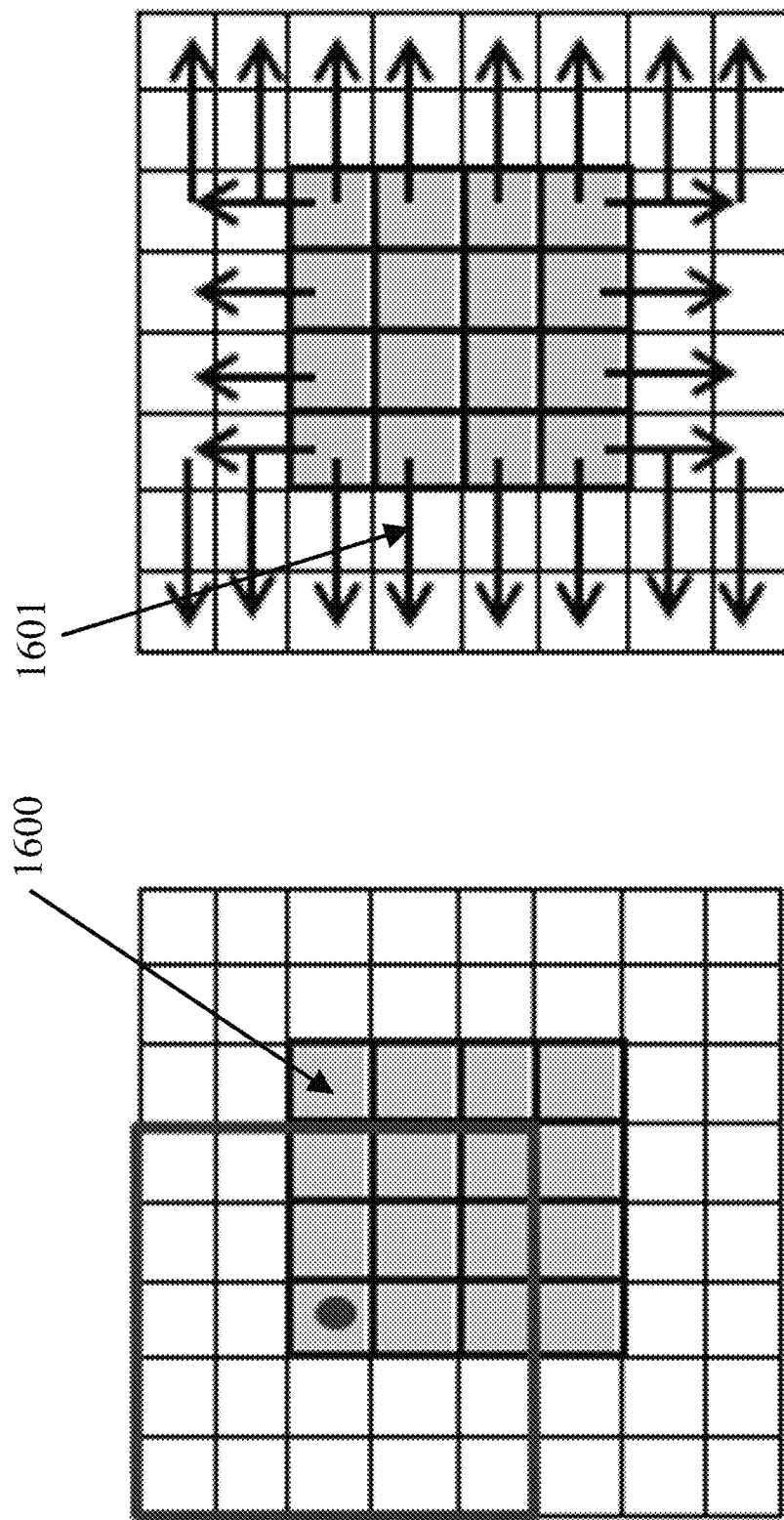
FIGS. 16A and 16B show example snapshots of using of the bi-directional optical flow (BIO) algorithm without block extensions.

The motion vector field $(V_x, V_y)$ is determined by minimizing the difference Δ between values in points A and B. FIGS. 16A-16B show an example of intersection of motion trajectory and reference frame planes. Model uses only first linear term of a local Taylor expansion for Δ:

$$\Delta = (I^{(0)} - I^{(1)}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad \text{Eq.(5)}$$

All values in the above equation depend on the sample location, denoted as (i', j'). Assuming the motion is consistent in the local surrounding area, Δ can be minimized inside the (2M+1)×(2M+1) square window Ω centered on the currently predicted point (i, j), where M is equal to 2:

$$(v_x, v_y) = \operatorname*{argmin}_{v_x, v_y} \sum_{[i',j'] \in \Omega} \Delta^2[i', j'] \quad \text{Eq. (6)}$$

For this optimization problem, the JEM uses a simplified approach making first a minimization in the vertical direction and then in the horizontal direction. This results in the following:

$$v_x = (s_1 + r) > m ? \operatorname{clip3}\left(-thBIO, thBIO, -\frac{s_3}{(s_1 + r)}\right) : 0 \quad \text{Eq. (7)}$$

-continued $$v_y = (s_5 + r) > m\,?\,\text{clip3}\left(-thBIO, thBIO, -\frac{s_6 - v_x s_2/2}{(s_5 + r)}\right) : 0 \quad \text{Eq. (8)}$$

where, $$s_1 = \sum_{[i',j]\in\Omega} (\tau_1 \partial I^{(1)}/\partial x + \tau_0 \partial I^{(0)}/\partial x)^2; \quad \text{Eq. (9)}$$

$$s_3 = \sum_{[i',j]\in\Omega} (I^{(1)} - I^{(0)})(\tau_1 \partial I^{(1)}/\partial x + \tau_0 \partial I^{(0)}/\partial x);$$

$$s_2 = \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j]\in\Omega} (\tau_1 \partial I^{(1)}/\partial y + \tau_0 \partial I^{(0)}/\partial y)^2;$$

$$s_6 = \sum_{[i',j]\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (7) and Eq. (8), where:

$$r = 500 \cdot 4^{d-8} \quad \text{Eq. (10)}$$

$$m = 700 \cdot 4^{d-8} \quad \text{Eq. (11)}$$

Here, d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 16A shows an example of access positions outside of a block 2200. As shown in FIG. 16A, in Eq. (9), (2M+1)×(2M+1) square window Ω centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 2201, as shown in FIG. 16B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y)\in b_k}\sum_{[i',j]\in\Omega(x,y)} (\tau_1 \partial I^{(1)}/\partial x + \tau_0 \partial I^{(0)}/\partial x)^2; \quad \text{Eq. (12)}$$

$$s_{3,b_k} = \sum_{(x,y)\in b_k}\sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k}\sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y)\in b_k}\sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k}\sum_{[i',j]\in\Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (7) and Eq (8) are replaced by $((s_n, b_k)>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient ∂I/∂x, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient ∂I/∂y, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Example filters for gradient calculation in BIO

| Fractional pel position | Interpolation filter for gradient (BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Example interpolation filters for prediction signal generation in BIO

| Fractional pel position | Interpolation filter for prediction signal (BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |

TABLE 2-continued

Example interpolation filters for
prediction signal generation in BIO

| Fractional pel position | Interpolation filter for prediction signal (BIOfilterS) |
|---|---|
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.5 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 17:
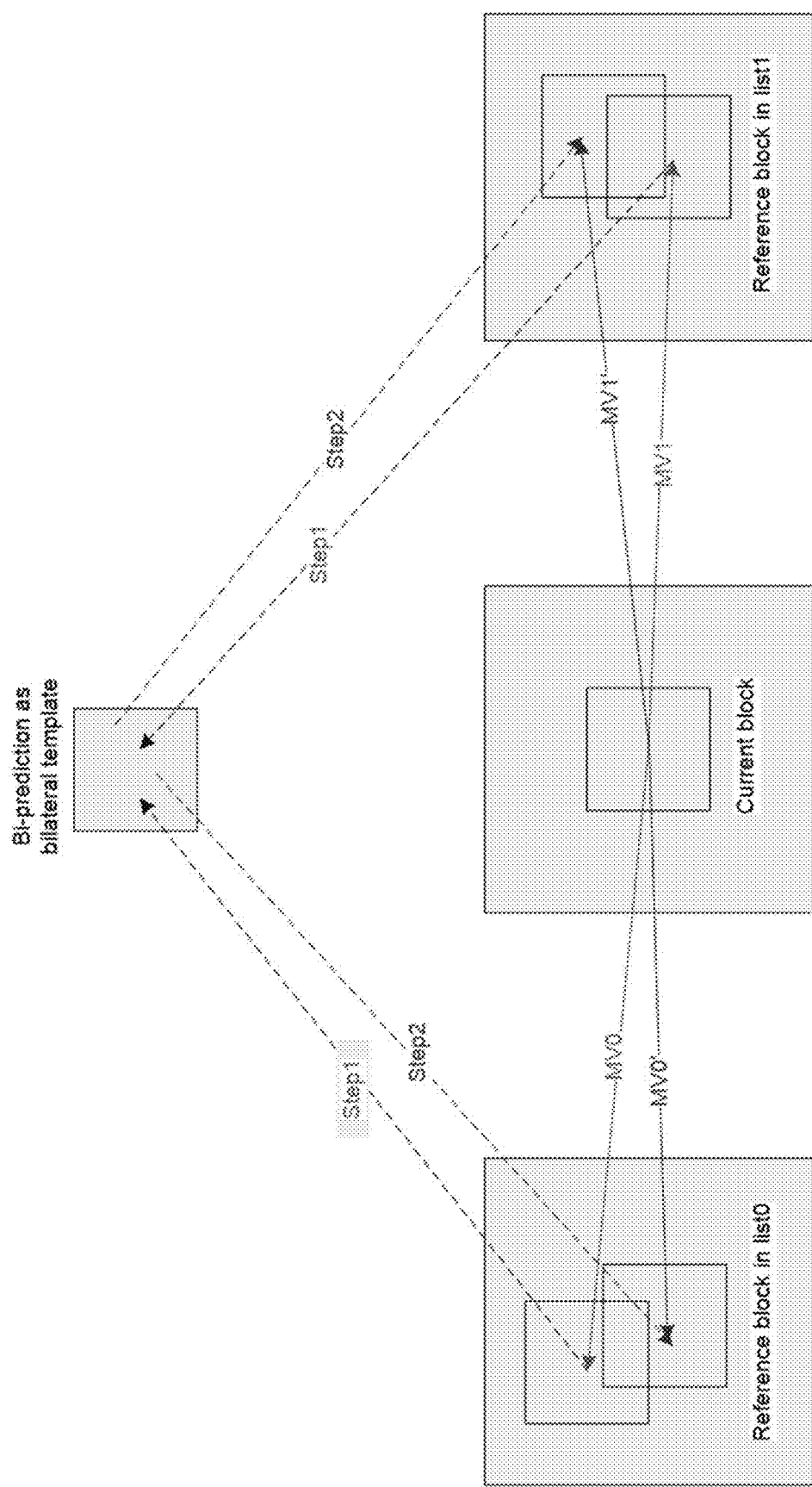
FIG. 17 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 17. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 17, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Embodiments of Related Methods that use Asymmetric Weighting

In an existing implementation, generalized bi-prediction (GBI) for inter coding is proposed as in Eq. (13):

$$P[x] = (1-w) \cdot P_0[x+v_0] + w \cdot P_1[x+v_i] \quad \text{Eq. (13)}$$

Here w is the weight value, x is the coordinate of the current block, $P_0$ and $P_1$ are the reference pictures in list0 and list1 respectively, and $v_0$ and $v_1$ are the motion vectors in $P_0$ and $P_1$. The candidate set of weights in the GBI mode includes a total of 7 weights (W={−¼, ¼, ⅜, ½, ⅝, ¾, 5/4}), including 0.5 which corresponds to the conventional bi-prediction mode. An index pointing to the entry position of a weight value in the candidate weight set is signalled. At most one index per CU is signalled and the corresponding weight values are shared across all the PUs and all color components in that CU.

To reduce signaling overhead for the index, each coding unit (CU) is assigned with at most one w shared across all its bi-prediction prediction units (PUs). The index of w is signaled explicitly, if a CU contains at least one bi-prediction PU that needs signaling motion vector difference (MVD). Otherwise, no index needs to be signaled. Then, the following rules are applied for determining the weight value for each PU in a CU:

For each bi-prediction PU that requires signaling MVD (i.e. normal inter prediction mode and affine prediction mode), its weight value is set equal to the explicitly signaled w.

For each bi-prediction PU that is coded with merge modes, advanced temporal motion vector prediction or the affine merge mode, its weight value w is inferred directly from the weight value used for the associated merge candidate.

For the remaining bi-prediction PUs, their weight values are set equal to the default weight value, that is, 0.5.

However, this method performs a complex selection between different weights in AMVP mode, and the encoding time is increased to 300% when compared with the traditional method. Furthermore, the signaling cost may be high because it explicitly signals the weight index for the AMVP case.

4. Exemplary Methods for Asymmetric Weighted Bi-Predictive Merging

Figure 18:
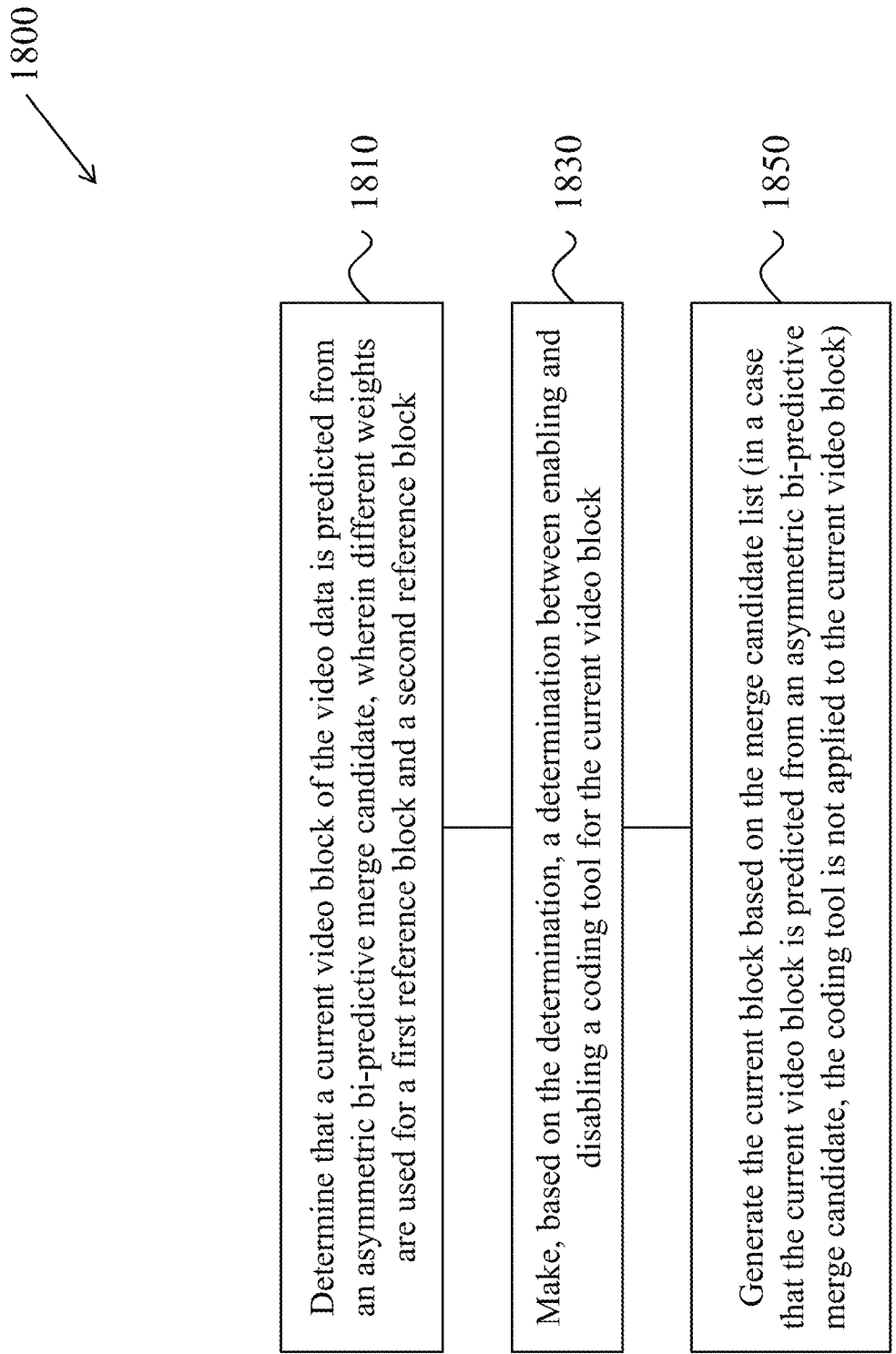
FIG. 18 shows a flowchart of an example method for video decoding using asymmetric weighted bi-predictive merging in accordance with the disclosed technology.

FIG. 18 shows a flowchart of an exemplary method 1800 for video decoding using asymmetric weighted bi-predictive merging. In some implementations, the method 1800 may include receiving a current block of the video data that is inter coded. The current block may be received from a video bitstream that is received over a network connection, or from a locally stored compressed video file(s). The decoding process may, for example, performing parsing of the video bitstream to arrive at the bits corresponding to the current block during the parsing process.

The method 1800 includes, at step 1810, determining that a current video block of the video data is predicted from an asymmetric bi-predictive merge candidate, wherein different weights are used for a first reference block and a second reference block. In some embodiments, the merge candidate comprises a motion vector and a corresponding reference picture. In some embodiments, the asymmetric weighting for video decoding is based on the model in Eq. (14) described below.

The method 1800 includes, at step 1830, making, based on the determination, a determination between enabling and disabling a coding tool for the current video block.

In some implementations, the method 1800 may include deriving motion information from at least the merge candidate list. For example, the motion information may comprise motion vector(s) (and the corresponding reference frames).

The method 1800 includes, at step 1850, generating the current block based on the merge candidate list. In a case that the current video block is predicted from an asymmetric bi-predictive merge candidate, the coding tool is not applied (e.g., application of the coding tool is disabled) to the current video block.

Figure 19:
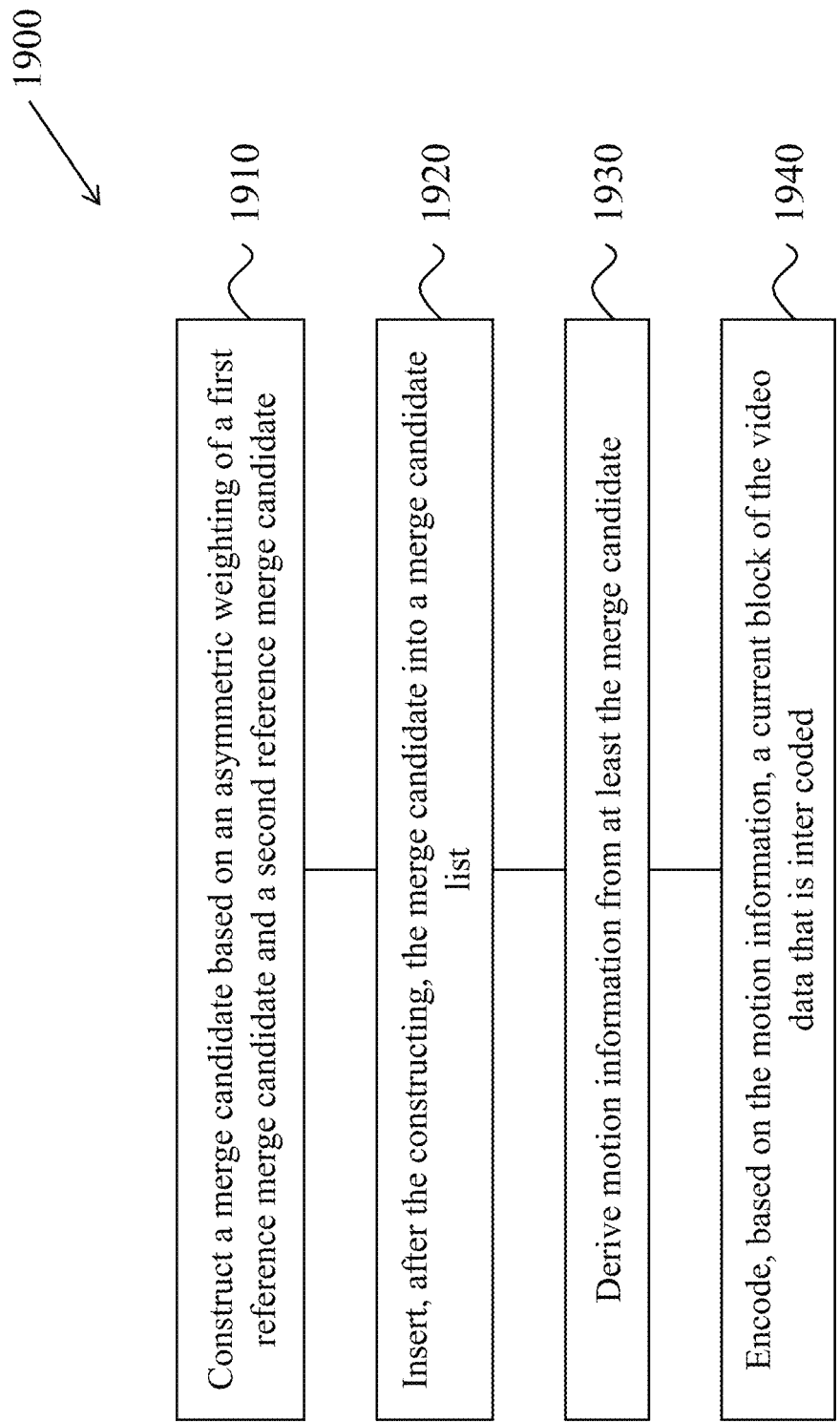
FIG. 19 shows a flowchart of an example method for video encoding using asymmetric weighted bi-predictive merging in accordance with the disclosed technology.

FIG. 19 shows a flowchart of an exemplary method for video encoding using asymmetric weighted bi-predictive merging. The method 1900 includes, at step 1910, constructing a merge candidate based on an asymmetric weighting of a first reference merge candidate and a second reference merge candidate. In some embodiments, the asymmetric weighting comprises a first weight and a second weight that is different from the first weight. In some embodiments, the asymmetric weighting for video encoding is based on the model in Eq. (14) described below.

The method 1900 includes, at step 1920, inserting, after the constructing, the merge candidate into a merge candidate list.

The method 1900 includes, at step 1930, deriving motion information from at least the merge candidate list.

The method 1900 includes, at step 1940, encoding, based on the motion information, a current block of the video data that is inter coded.

The methods 1900 and 1900 may further include different embodiments of the asymmetric weighting of the first reference merge candidate and the second reference merge candidate. In some embodiments, both the first reference merge candidate and the second reference merge candidate may be bi-directional candidates, such that each of them can include two motion vectors and corresponding motion information. In other embodiments, only one of the first or second reference merge candidates may be a bi-directional candidate.

In some embodiments, the merge candidate is based on the asymmetric weighting of the two distinct motion vectors (and corresponding motion information) from the first reference merge candidate. In other embodiments, the merge candidate is based on the asymmetric weighting of the two distinct motion vectors from the second reference merge candidate. In yet other embodiments, the merge candidate is based on the asymmetric weighting of a motion vectors from the first and second reference merge candidates.

The methods 1800 and 1900, described in the context of FIG. 18 and FIG. 19, respectively, may further include using the following model for bi-prediction:

$$P[x]=a \cdot P_0[x+v_0]+b \cdot P_1[x+v_i]$$ Eq. (14)

Here, $P_i[x+v_i]$ is the prediction value from reference picture list i associated with pixel located at x, and the weights (a, b) are defined as symmetric if a is equal to b, otherwise (a is not equal to b), the weights are defined as asymmetric. In some embodiments, a+b=1.

In some embodiments, asymmetric weighted bi-predictive merge candidates may derive motion information including prediction direction, reference indices, motion vectors, (and weights if the general bi-prediction tool is enabled) same as the merge candidates in existing designs, such as HEVC and JEM etc. al. However, different from existing merge candidates which apply symmetric weighted bi-prediction, asymmetric weighted bi-prediction is used (if the GBI is not enabled), or more merge candidates by applying different asymmetric weights may be considered in the merge candidate list construction process (if the GBI is enabled).

The use of asymmetric weighting to generate bi-predictive merge candidates is elucidated in the following examples described for various implementations and motion compensation algorithms. The examples described below may be incorporated in the context of the above described methods, e.g., methods 2400 and 2500, which may be implemented at the decoder and encoder, respectively.

Example 1

Asymmetric weights can be applied to one, some or all existing merge candidates (or newly designed merge candidates in the future). For example, spatial merge candidates, temporal merge candidates, additional merge candidates, ATMVP, STMVP, PMMVD, etc. can be used to generate asymmetric weighted bi-predictive merge candidates, which are further inserted into the merge list.

(a) In an example, asymmetric weights can be applied to the first N available bi-directional merge candidates, where N is a positive integer.

(b) In an example, asymmetric weights can only be applied to N bi-directional merge candidates which have asymmetric picture order count (POC (picture of order) difference between the current picture and its two reference pictures. Denote AbsPOCDiff(x, y) as the function that calculates absolute POC difference between picture x and y, denote $P_0$ and $P_1$ as the reference picture from list 0 and list 1 respectively, and denote $P_c$ as the current picture. If AbsPOCDiff($P_0$, $P_c$) is not equal to AbsPOCDiff($P_1$, $P_c$), the POC difference is defined as asymmetric.

(c) In an example, only certain types of merge candidates (such as advanced temporal motion vector prediction or the affine merge mode) may be selected to apply asymmetric weights.

(d) In an example, new merge candidates may be derived by applying asymmetric weights to merge candidates with symmetric weights. If a merge candidate derived with existing method already have asymmetric weights, such as a spatial merging candidate with weights inherited from a neighboring block, this spatial merge candidate won't be chosen to apply asymmetric weight. Alternatively, in the other way around, new merge candidates may be derived by applying different asymmetric weights to merge candidates with asymmetric weights, such as spatial merging candidates or temporal merging candidates derived with existing methods.

(e) When generating asymmetric weighted bi-predictive merge candidates, the weight value w in Eq. (14) is restricted as follows:
  (i) Only weight values larger than ½ can be assigned to a when AbsPOCDiff ($P_c$, $P_0$)<AbsPOCDiff ($P_c$, $P_1$).
  (ii) Only weight values larger than ½ can be assigned to b when AbsPOCDiff ($P_c$, $P_0$)>AbsPOCDiff ($P_c$, $P_1$).

Example 2

One or a set of asymmetric weights can be applied to the selected N bi-directional merge candidates.
  (a) In an example, individual asymmetric (a, b) are applied to each of the N merge candidates. Different (a, b)s can be applied to different merge candidates.
  (b) In an example, several asymmetric (a, b)s can be applied to each of the N merge candidates. Some candidates may share the same (a, b).
  (c) In an example, several asymmetric (a, b)s can be applied to the first M (M<N) merge candidates, and only one asymmetric (a, b) is applied to the remaining N−M merge candidates. For example, M is set equal to 1.

Example 3

Sets of asymmetric weights can be signaled to the decoder in VPS (video parameter set), SPS (sequence parameter set), PPS (picture parameter set) or slice header. Alternatively, asymmetric weights can be fixed in both encoder and decoder implicitly.
- (a) In an example, asymmetric weights of a include $\{1/16, 2/16, 3/16, 4/16, 5/16, 6/16, 7/16, 9/16, 10/16, 11/16, 12/16, 13/16, 14/16, 15/16\}$.
- (b) In an example, asymmetric weights of a include $\{1/8, 2/8, 3/8, 5/8, 6/8, 7/8\}$.
- (c) In a more general case, asymmetric weights of a include $\{1/2^N, 2/2^N, \ldots, 2^N-2/2^N, 2^N-1/2^N\}$, where N is a positive integer number such as 2, 3, 4 and 5.
- (d) In an example, asymmetric weights of a and b may also be negative.

Example 4

Insertion of asymmetric weighted bi-predictive merge candidates into the merge list obeys the following rules:
- (a) In an example, the same rule may be applied to all blocks within a slice/tile/picture/sequence. Alternatively, the order may be adjusted from block to block.
- (b) If an asymmetric weighted bi-predictive merge candidate A is generated from symmetric weighted bi-predictive merge candidates B, then, A is inserted after (may be not directly after though) B in merge candidate list.
- (c) Suppose asymmetric weighted bi-predictive merge candidates A1 and A2 are generated from symmetric weighted bi-predictive merge candidates B1 and B2 respectively, if B1 is before B2 in the merge list, then A1 shall be before (may be not directly before though) A2 in the merge list too, and vice versa.
- (d) If multiple asymmetric weighted bi-predictive merge candidates, with weights (a1, b1), (a2, b2), . . . , (aNA, bNA), are generated from one symmetric weighted bi-predictive merge candidate, then they are inserted in a given order, such as in the ascending order of abs(ai-½), where abs(x) calculates the absolute value of x, and 1<=i<=NA. if abs(ai-½) equals to abs(aj-½), then they can be inserted in any order.
- (e) In an example, two asymmetric weighted bi-predictive merge candidates are inserted right after the first bi-predictive merge candidate, with the weighting values (¼, ¾) and (¾, ¼).
- (f) In an example, the newly generated weighted bi-predictive merge candidates may be added after a certain merge candidate derived with the existing method, such as right after the TMVP or ATMVP or STMVP or combine bi-predictive merge candidates.
- (g) Two merge candidate lists may be firstly constructed, one is with the existing methods and the other is obtained by applying asymmetric weights to the first list, or to partial of the merge candidates in the first list. In this case, different orders of the two candidate lists may be invoked for different blocks.

Example 5

Weight values are stored for blocks coded with bi-predictive merge mode, and may be reused by blocks coded after them.
- (a) In an example, asymmetric weight values of spatial/temporal merge candidates can be inherited from the weighting values of corresponding spatial/temporal neighboring blocks in the merge list construction process. In this case, these merge candidates themselves are asymmetric weighted bi-predictive merge candidates. In one example, these candidates are not used to generate new asymmetric weighted bi-predictive merge candidates anymore. Only symmetric weights can be used to generate asymmetric weighted merge candidates. Alternatively, these candidates can also be used to generate new asymmetric weighted bi-predictive merge candidates, but with different weighting values.
- (b) In an example, asymmetric weight values are not inherited in merge list construction process.
- (c) The above methods may be also applicable when the general bi-prediction tool is enabled.

Example 6

With asymmetric weighted bi-predictive merge candidates, the maximum merge list length is increased by L, where L>=0.
- (a) If at most T asymmetric weighted bi-predictive merge candidates can be added to the merge list, then L<=T.

Example 7

Harmonization of asymmetric weighted bi-predictive merge candidates with existing coding tools.
- (a) Asymmetric weighted bi-predictive merge candidates are not inserted into the merge candidate list when weighted prediction, local illumination compensation or bi-directional optical flow applies. In some implementations, the weighted prediction includes a coding tool that allows an encoder to specify the use of a scaling and offset when performing motion compensation, and providing a significant benefit in performance in special cases—such as fade-to-black, fade-in, and cross-fade transitions.
- (b) DMVR is disabled for asymmetric weighted bi-predictive merge candidates.
- (c) Alternatively, DMVR is enabled for asymmetric weighted bi-predictive merge candidates, and the template P is generated as in Eq. (14).
  - (i) After motion refinement and motion compensation with the refined motion information (in each reference list), symmetric weighted average applies for the final bi-prediction.
  - (ii) After motion refinement and motion compensation with the refined motion information (in each reference list), asymmetric weighted average (same as the asymmetric weighted bi-predictive merge candidates) applies for the final bi-prediction.

Example 8

Whether to and how to insert asymmetric weighted bi-predictive merge candidates into the merge candidate list may depend on the size and/or shape of the current block, and/or coded block information.
- (a) In an example, suppose the current block size is M×N, asymmetric weighted bi-predictive merge candidates are not inserted into the merge candidate list if M×N<=T; Alternatively, asymmetric weighted bi-predictive merge candidates are not inserted into the merge candidate list if M×N>=T. T is a integer number such as 32 or 64.

(b) Alternatively, it may apply only when M is equal to N or M unequal to N.
(c) Alternatively, it may depend on the block mode, such as non-affine mode.
(d) Alternatively, it may also depend on the total number of merging candidates (excluding combined bi-predictive merging candidates and/or zero motion merging candidates) derived from existing designs. If it reaches the total number of allowed merge candidate, there is no need to add asymmetric weighted bi-predictive merge candidates.

Example 9

The asymmetric weighted bi-prediction can be applied to all components including Y, Cb, Cr or R, G, B. Alternatively, it may be applied to only one or some components. For example, it is only applied to the Y component.

Example 10

An asymmetric weighted bi-predictive merge candidate with weighting values (a1, b1) have a higher priority (or to say, is inserted into the merge candidate list closer to the front of the merge candidate list) than another asymmetric weighted bi-predictive merge candidate with the same motion information (MV0 referring to Reference Picture R0, MV1 referring to Reference Picture R1), but different weighting values (a2, b2) and a1-b1>a2-b2, if one or several conditions below are satisfied.
(a) quantization parameter (QP) of R0 is lower than QP of R1
(b) R0 is closer to the current picture than R1
(c) QP of the reference block pointed by MV0 is lower than QP of the reference block pointed by MV1

Example 11

It should be noted that the proposed methods may also be applicable to multi hypothesis motion prediction.
(a) In an example, for the multiple prediction blocks, different weights may be applied to each prediction block.
(b) Alternatively, if it is bi-prediction, for each reference picture list, two temporary prediction blocks (which may be generated from multiple reference blocks associated one reference picture list) may be firstly obtained and two weights may further apply.
(c) Alternatively, if it is uni-prediction but from two or more reference blocks, asymmetric weights may also be applied.

Example 12

Figure 20:
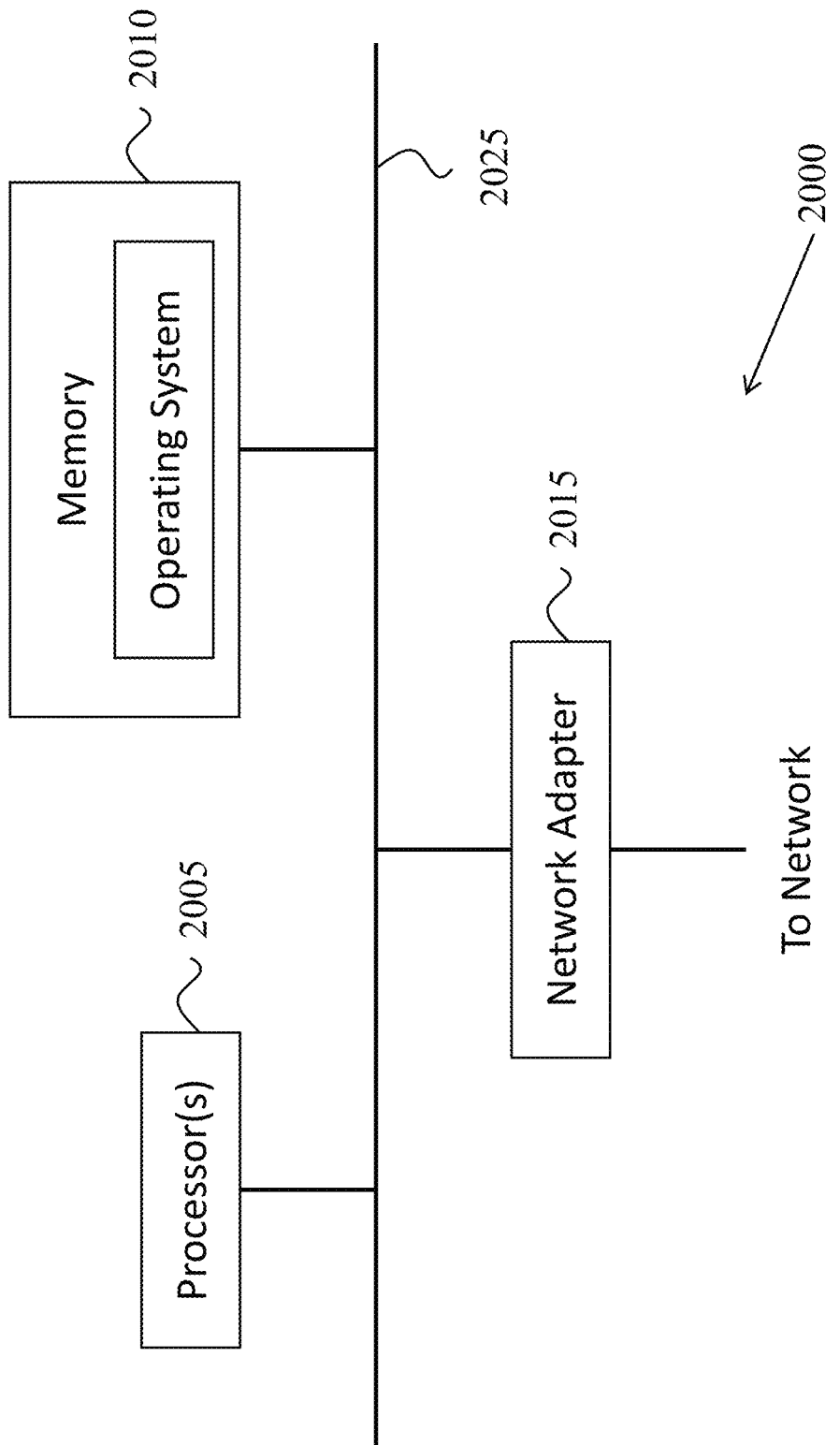
FIG. 20 is a block diagram illustrating an example of the architecture for a computer system or other control device that can be utilized to implement various portions of the presently disclosed technology.

The pruning process in merge mode may also consider the weights in addition to motion information.
5. Example Implementations of the Disclosed Technology
FIG. 20 is a block diagram illustrating an example of the architecture for a computer system or other control device 2000 that can be utilized to implement various portions of the presently disclosed technology, including (but not limited to) methods 1800 and 1900. In FIG. 20, the computer system 2000 includes one or more processors 2005 and memory 2010 connected via an interconnect 2025. The interconnect 2025 may represent any one or more separate physical buses, point to point connections, or both, connected by appropriate bridges, adapters, or controllers. The interconnect 2025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2005 may include central processing units (CPUs) to control the overall operation of, for example, the host computer. In certain embodiments, the processor(s) 2005 accomplish this by executing software or firmware stored in memory 2010. The processor(s) 2005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2010 can be or include the main memory of the computer system. The memory 2010 represents any suitable form of random access memory (RAM), read-only memory (ROM), flash memory, or the like, or a combination of such devices. In use, the memory 2010 may contain, among other things, a set of machine instructions which, when executed by processor 2005, causes the processor 2005 to perform operations to implement embodiments of the presently disclosed technology.

Also connected to the processor(s) 2005 through the interconnect 2025 is a (optional) network adapter 2015. The network adapter 2015 provides the computer system 2600 with the ability to communicate with remote devices, such as the storage clients, and/or other storage servers, and may be, for example, an Ethernet adapter or Fiber Channel adapter.

Figure 21:
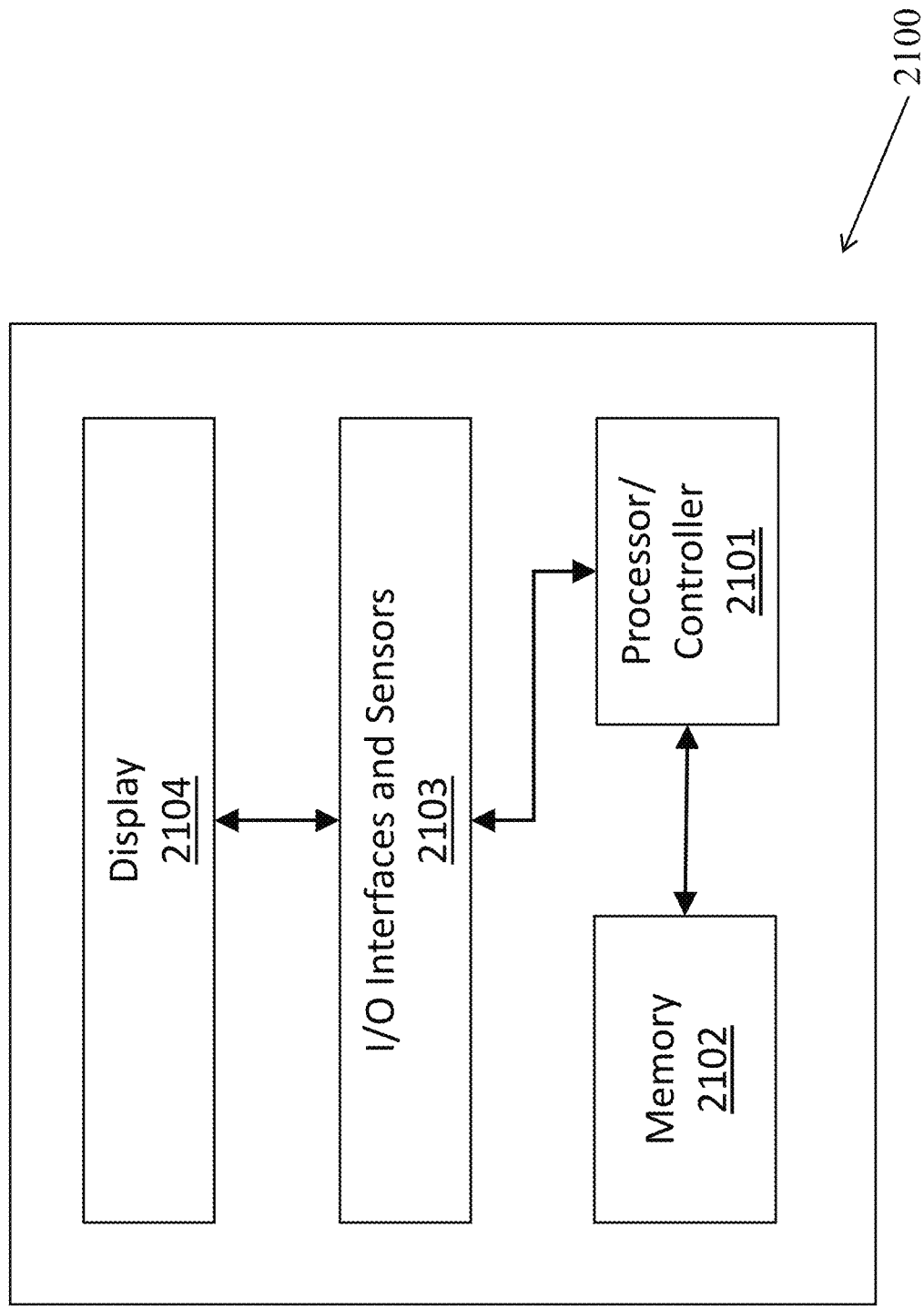
FIG. 21 shows a block diagram of an example embodiment of a mobile device that can be utilized to implement various portions of the presently disclosed technology.

FIG. 21 shows a block diagram of an example embodiment of a mobile device 2100 that can be utilized to implement various portions of the presently disclosed technology, including (but not limited to) methods 1800 and 1900. The mobile device 2100 can be a laptop, a smartphone, a tablet, a camcorder, or other types of devices that are capable of processing videos. The mobile device 2100 includes a processor or controller 2101 to process data, and memory 2102 in communication with the processor 2101 to store and/or buffer data. For example, the processor 2101 can include a central processing unit (CPU) or a microcontroller unit (MCU). In some implementations, the processor 2101 can include a field-programmable gate-array (FPGA). In some implementations, the mobile device 2100 includes or is in communication with a graphics processing unit (GPU), video processing unit (VPU) and/or wireless communications unit for various visual and/or communications data processing functions of the smartphone device. For example, the memory 2102 can include and store processor-executable code, which when executed by the processor 2101, configures the mobile device 2100 to perform various operations, e.g., such as receiving information, commands, and/or data, processing information and data, and transmitting or providing processed information/data to another device, such as an actuator or external display.

To support various functions of the mobile device 2100, the memory 2102 can store information and data, such as instructions, software, values, images, and other data processed or referenced by the processor 2101. For example, various types of Random Access Memory (RAM) devices, Read Only Memory (ROM) devices, Flash Memory devices, and other suitable storage media can be used to implement storage functions of the memory 2102. In some implementations, the mobile device 2100 includes an input/output (I/O) unit 2103 to interface the processor 2101 and/or memory 2102 to other modules, units or devices. For example, the I/O unit 2103 can interface the processor 2101 and memory 2102 with to utilize various types of wireless interfaces compatible with typical data communication standards, e.g., such as between the one or more computers in the cloud and the user device. In some implementations, the mobile device 2100 can interface with other devices using a wired connection via the I/O unit 2103. The mobile device 2100 can also interface with other external interfaces, such as data storage, and/or visual or audio display devices 2104, to retrieve and transfer data and information that can be processed by the processor, stored in the memory, or exhibited on an output unit of a display device 2104 or an external device. For example, the display device 2104 can display a video frame that includes a block (a CU, PU or TU) that applies the intra-block copy based on whether the block is encoded using a motion compensation algorithm, and in accordance with the disclosed technology.

In some embodiments, a video decoder apparatus may implement a method of video decoding in which asymmetric weighted bi-predictive merging as described herein is used for video decoding. The method may be similar to the above-described method 1800.

In some embodiments, a decoder-side method of video decoding may use asymmetric weighted bi-predictive merging for improving video quality by receiving a current block of the video data that is inter coded, constructing a merge candidate based on an asymmetric weighting of a first reference merge candidate and a second reference merge candidate, where the asymmetric weighting includes a first weight and a second weight that is different from the first weight, and where the merge candidate comprises a motion vector and a corresponding reference picture, inserting, after the constructing, the merge candidate into a merge candidate list, deriving motion information from at least the merge candidate list, and decoding the current block based on the motion information, the motion vector and the corresponding reference picture.

In some embodiments, the video decoding methods may be implemented using a decoding apparatus that is implemented on a hardware platform as described with respect to FIG. 20 and FIG. 21. In some embodiments, the video decoding operations may be performed by a video encoder during encoding process in which the video encoder determines the reconstructed video image as a decoder would.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for coding video data, comprising:
constructing a merge motion candidate list for a current video block;
determining a merge candidate from the merge motion candidate list; and
disabling at least one coding tool, when the merge candidate is an asymmetric bi-predictive merge candidate;
wherein different weights indicated by the asymmetric bi-predictive merge candidate are applied to a first prediction block and a second prediction block of the current video block to acquire a final prediction block,
wherein the at least one coding tool includes a decoder-side motion vector refinement (DMVR).

2. The method of claim 1, wherein in response to the merge candidate being not an asymmetric bi-predictive merge candidate and the DMVR being enabled, the method further comprises:
refining motion information derived from the merge candidate and performing motion compensation on the current block to acquire two prediction blocks; and
applying same weights to the two prediction blocks to acquire a final prediction block.

3. The method of claim 1, wherein the at least one coding tool further includes weighted prediction.

4. The method of claim 1, wherein the at least one coding tool further includes bi-directional optical flow that is used to refine prediction blocks of a bi-prediction.

5. The method of claim 1, wherein the merge candidate is one of a spatial merge candidate derived from a spatial neighboring block, a temporal merge candidate derived from a temporal neighboring block or an alternative temporal motion vector prediction candidate.

6. The method of claim 1, wherein the weights applied for the current video block are inherited from a block from which the asymmetric bi-predictive merge candidate is derived.

7. The method of claim 1, wherein the merge motion candidate list corresponds to a component which is a luma component.

8. The method of claim 1, wherein values of the weights are chosen from a predefined weight set.

9. The method of claim 8, wherein the predefined weight set includes a negative weight value.

10. An apparatus for coding video data comprising a processor and a non-transitory memory with instructions thereon, wherein the instructions upon execution by the processor, cause the processor to:
construct a merge motion candidate list for a current video block;
determine a merge candidate from the merge motion candidate list; and
disable at least one coding tool, when the merge candidate is an asymmetric bi-predictive merge candidate;
wherein different weights indicated by the asymmetric bi-predictive merge candidate are applied to a first prediction block and a second prediction block of the current video block to acquire a final prediction block,
wherein the at least one coding tool includes a decoder-side motion vector refinement (DMVR).

11. The apparatus of claim 10, wherein in response to the merge candidate being not an asymmetric bi-predictive merge candidate and the DMVR being enabled, the instructions upon execution by the processor, cause the processor to:
refine motion information derived from the merge candidate and perform motion compensation on the current block to acquire two prediction blocks; and
apply same weights to the two prediction blocks to acquire a final prediction block.

12. The apparatus of claim 10, wherein the at least one coding tool further includes weighted prediction.

13. The apparatus of claim 10, wherein the at least one coding tool further includes bi-directional optical flow that is used to refine prediction blocks of a bi-prediction.

14. The apparatus of claim 10, wherein the merge candidate is one of a spatial merge candidate derived from a spatial neighboring block, a temporal merge candidate derived from a temporal neighboring block or an alternative temporal motion vector prediction candidate.

15. The apparatus of claim 10, wherein the weights applied for the current video block are inherited from a block from which the asymmetric bi-predictive merge candidate is derived.

16. The apparatus of claim 10, wherein the merge motion candidate list corresponds to a component which is a luma component.

17. The apparatus of claim 10, wherein values of the weights are chosen from a predefined weight set.

18. A non-transitory computer-readable storage medium storing instructions that cause a processor to:
construct a merge motion candidate list for a current video block;
determine a merge candidate from the merge motion candidate list; and
disable at least one coding tool, when the merge candidate is an asymmetric bi-predictive merge candidate;
wherein different weights indicated by the asymmetric bi-predictive merge candidate are applied to a first prediction block and a second prediction block of the current video block to acquire a final prediction block,
wherein the at least one coding tool includes a decoder-side motion vector refinement (DMVR).

19. The Apparatus of claim 17, wherein the predefined weight set includes a negative weight value.

20. A non-transitory computer-readable recording medium storing a bitstream representation which is generated by a method performed by a video processing apparatus, wherein the method comprises:

constructing a merge motion candidate list for a current video block;
determining a merge candidate from the merge motion candidate list; and
disabling at least one coding tool, when the merge candidate is an asymmetric bi-predictive merge candidate;
wherein different weights indicated by the asymmetric bi-predictive merge candidate are applied to a first prediction block and a second prediction block of the current video block to acquire a final prediction block, wherein the at least one coding tool includes a decoder-side motion vector refinement (DMVR).

* * * * *